US011235764B2

(12) United States Patent
Bogner et al.

(10) Patent No.: US 11,235,764 B2
(45) Date of Patent: Feb. 1, 2022

(54) DRIVER ASSISTANCE SYSTEM IN A MOTOR VEHICLE

(71) Applicant: Bayerische Motoren Werke Aktiengesellschaft, Munich (DE)

(72) Inventors: Andreas Bogner, Oberschleissheim (DE); Andreas Mueller, Munich (DE); Daniel Simmermacher, Munich (DE); Hans-Peter Hank, Munich (DE); Manfred Paul, Dachau (DE); Martin Froehlich, Kranzberg (DE); Mehdi Farid, Munich (DE); Nico Kaempchen, Marzling (DE); Norman Hauke, Garching (DE); Thomas Barmeyer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 619 days.

(21) Appl. No.: 15/784,370

(22) Filed: Oct. 16, 2017

(65) Prior Publication Data
US 2018/0037224 A1 Feb. 8, 2018

Related U.S. Application Data

(63) Continuation of application No. PCT/EP2016/058043, filed on Apr. 13, 2016.

(30) Foreign Application Priority Data

Apr. 17, 2015 (DE) ...................... 10 2015 207 025.5

(51) Int. Cl.
*B60W 30/12* (2020.01)
*B60W 50/08* (2020.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC ...... B60W 30/10; B60W 30/12; B60W 10/18; B60W 10/20; B60W 30/165;
(Continued)

(56) References Cited

U.S. PATENT DOCUMENTS 6,370,471 B1 * 4/2002 Lohner ................. B60W 30/10
701/96
8,983,732 B2 * 3/2015 Lisseman ............. B60K 28/066
701/45

(Continued)

FOREIGN PATENT DOCUMENTS

| CN | 104002811 A | 8/2014 |
| CN | 104245392 A | 12/2014 |

(Continued)

OTHER PUBLICATIONS

Chinese-language Office Action issued in Chinese Application No. 201680021391.2 dated Feb. 3, 2020 with English translation (15 pages).

(Continued)

*Primary Examiner* — Isaac G Smith
(74) *Attorney, Agent, or Firm* — Crowell & Moring LLP

(57) ABSTRACT

A driver assistance system is provided in a motor vehicle, which driver assistance system executes at least active transverse guidance interventions. The driver assistance system can be activated while decoupled from the activation of a longitudinal control system but can also be active both, with and without longitudinal control, and includes both a traffic jam assistance sub-function and a track guiding assistant sub-function. The two sub-functions can be jointly (Continued)

activated and deactivated by a single on-/off-button. The driver assistance system is characterized by a special combination of the sub-functions track guiding assistance and traffic jam assistance. They each take turns depending on the presence of conditions, which are defined differently for each sub-function.

21 Claims, 4 Drawing Sheets

(51) Int. Cl.
  *B60W 30/165* (2020.01)
  *B60W 10/18* (2012.01)
  *B60W 10/20* (2006.01)
  *B60W 30/14* (2006.01)
  *B60W 30/18* (2012.01)
  *B60W 50/14* (2020.01)
  *G08G 1/16* (2006.01)

(52) U.S. Cl.
  CPC ........ *B60W 30/143* (2013.01); *B60W 30/165* (2013.01); *B60W 30/18018* (2013.01); *B60W 50/082* (2013.01); *B60W 50/14* (2013.01); *G08G 1/167* (2013.01); *B60K 2370/782* (2019.05); *B60W 2050/146* (2013.01); *B60W 2420/24* (2013.01); *B60W 2420/42* (2013.01); *B60W 2420/52* (2013.01); *B60W 2510/205* (2013.01); *B60W 2520/10* (2013.01); *B60W 2520/105* (2013.01); *B60W 2520/14* (2013.01); *B60W 2554/00* (2020.02); *B60W 2720/10* (2013.01)

(58) Field of Classification Search
  CPC ......... B60W 30/143; B60W 30/18018; B60W 50/082; B60W 50/14; G08G 1/167
  USPC .......................................................... 701/41
  See application file for complete search history.

(56) References Cited

U.S. PATENT DOCUMENTS

| | | |
|---|---|---|
| 2010/0250066 A1 | 9/2010 | Eckstein et al. |
| 2011/0190961 A1 | 8/2011 | Giebel et al. |
| 2014/0244131 A1 | 8/2014 | Mielich et al. |
| 2015/0032322 A1 | 1/2015 | Wimmer et al. |
| 2015/0151757 A1 | 6/2015 | De Bruin et al. |
| 2015/0166062 A1* | 6/2015 | Johnson ................ B60W 10/20 701/41 |
| 2015/0177007 A1 | 6/2015 | Su et al. |
| 2015/0217807 A1 | 8/2015 | Schumacher et al. |
| 2015/0307095 A1* | 10/2015 | Aso ........................ B60W 30/12 701/1 |
| 2016/0288830 A1* | 10/2016 | Hori ...................... B62D 15/025 |

FOREIGN PATENT DOCUMENTS

| | | |
|---|---|---|
| CN | 104520159 A | 4/2015 |
| DE | 10 2009 014 153 A1 | 12/2009 |
| DE | 10 2010 063 792 A1 | 6/2012 |
| DE | 10 2011 085 167 A1 | 4/2013 |
| DE | 10 2012 215 057 A1 | 2/2014 |
| DE | 10 2013 001 590 A1 | 7/2014 |
| DE | 10 2013 003 187 A1 | 9/2014 |
| DE | 10 2013 103 877 A1 | 10/2014 |
| EP | 2 226 214 A1 | 9/2010 |

OTHER PUBLICATIONS

German-language Search Report issued in counterpart German Application No. 10 2015 207 025.5 dated Feb. 5, 2016 with partial English translation (14 pages).

International Search Report (PCT/ISA/210) issued in PCT Application No. PCT/EP2016/058043 dated Aug. 10, 2016 with English translation (9 pages).

German-language Written Opinion (PCT/ISA/237) issued in PCT Application No. PCT/EP2016/058043 dated Aug. 10, 2016 (8 pages).

Chinese-language Office Action issued in counterpart Chinese Application No. 201680021391.2 dated Dec. 21, 2018 with English translation (18 pages).

* cited by examiner

DRIVER ASSISTANCE SYSTEM IN A MOTOR VEHICLE

CROSS REFERENCE TO RELATED APPLICATIONS

This application is a continuation of PCT International Application No. PCT/EP2016/058043, filed Apr. 13, 2016, which claims priority under 35 U.S.C. §119 from German Patent Application No. 10 2015 207 025.5, filed Apr. 17, 2015, the entire disclosures of which are herein expressly incorporated by reference.

BACKGROUND AND SUMMARY OF THE INVENTION

The invention relates to a driver assistance system in a motor vehicle, which driver assistance system carries out at least active lateral guidance interventions (in particular steering interventions).

A variety of systems of this kind are already known, for example, in the form of lane change assistants and/or haptic lane departure warning systems or lane departure prevention systems.

Furthermore, a steering assistant which can be switched on only when the longitudinal guidance system is activated and after additional operation of a separate steering assistant button is known from the vehicles with the "ACC, active speed control with Stop&Go function and with traffic jam assistant" system produced in series by the Applicant.

Furthermore, driver assistance systems with hands-on monitoring operations and hands-on requests at fixedly predefined time intervals are known in principle.

The object of the invention is to improve driver assistance systems of the kind outlined in the introductory part with respect to easier handling, better clarity and a higher and more anticipatory assistance level.

According to the invention, this and other objects are achieved by a driver assistance system in a motor vehicle, which driver assistance system carries out at least active lateral guidance interventions. The driver assistance system can be activated in a manner decoupled from the activation of a longitudinal control system, but can be active both with and without longitudinal control. The driver assistance system comprises a traffic jam assistant subfunction and a lane guidance assistant subfunction, wherein the two subfunctions can be activated and can be deactivated jointly by a single on/off button.

The driver assistance system according to the invention carries out at least active lateral guidance interventions (in particular steering interventions) in a motor vehicle, can be activated in a manner decoupled from the activation of a longitudinal control system, but can be active both with and without longitudinal control, and comprises both a traffic jam assistant subfunction (also called STA for short in the text which follows) and a lane guidance assistant subfunction (Active Lane Control, also called ALC for short in the text which follows), wherein the two subfunctions can be activated and can be deactivated jointly by a single on/off button (STA/ALC).

The single common button is preferably mounted in a multifunctional steering wheel in the vicinity of operator control elements of a longitudinal guidance system. The single common button can optionally also be used to automatically turn on longitudinal control when presetting operations corresponding to this have been carried out on the system side or on the driver side.

The driver assistance system according to the invention can be deactivated depending on a speed-dependent capacitive hands-on monitoring operation.

Furthermore, the driver assistance system according to the invention comprises a display concept which is situated preferably within or in the same location of the display region of a longitudinal guidance system. The display concept according to the invention represents a large number of states which will be discussed in detail further below using a particularly advantageous exemplary embodiment.

When the driver assistance system according to the invention is active, further safety systems can optionally be automatically switched on thereby, without the driver having to manually preselect them. Therefore, the driver assistance system according to the invention can be automatically coupled to further safety systems. Possible safety systems which can be coupled are, for example, a side collision warning system, a lane departure warning system or a pedestrian warning system.

The "STA/ALC" driver assistance system according to the invention is characterized, in particular, by a special combination of the "lane guidance assistant" and "traffic jam assistant" subfunctions too. Said subfunctions each switch over from one to the other depending on the presence of conditions which are differently defined for each subfunction.

The essential aspects of and the interaction between the two subfunctions of the driver assistance system according to the invention are explained below.

The traffic jam assistant subfunction (STA) can be activated when the vehicle speed lies below a predefined lower control speed threshold (for example 70 km/h) and a vehicle traveling ahead is identified at the same time, said vehicle traveling ahead possibly also serving as a target object for longitudinally controlled following travel in the case of an additional longitudinal control operation. The traffic jam assistant subfunction (STA) performs corrective steering interventions with respect to the vehicle traveling ahead in the form of laterally controlled following travel.

A safety system for haptic (steering wheel vibration or counter-steering) side collision prevention is preferably necessarily coupled to the traffic jam assistant subfunction (STA), as a result of which, in particular, the hazardous situation which can occur in the event of the vehicle traveling ahead changing lane without lane identification is taken into account.

The lane guidance assistant subfunction (ALC) can be activated when the vehicle speed lies below the predefined lower control speed threshold (for example 70 km/h) and no vehicle traveling ahead is identified at the same time or when the vehicle speed lies above the predefined lower control speed threshold (independently of a vehicle traveling ahead). The lane guidance assistant subfunction (ALC) carries out corrective steering interventions in respect of the center of the lane.

The lane guidance assistant subfunction (ALC) is preferably designed in such a way that it is oriented to a vehicle traveling in front for a predefined short period of time, optionally in the form of a time-limited lane identification bridging operation, when lane identification is not possible during active operation of said lane guidance assistant subfunction and a (new) vehicle traveling ahead is identified. The lane guidance assistant is therefore oriented primarily to existing lane markings, but, in the absence of lane identification or in the case of unreliable lane identification, can briefly bridge guidance to the center of the lane by way of orientation to a vehicle traveling ahead, provided that a changeover has not been made to the traffic jam assistant in any case owing to new lateral guidance-related following travel.

A hands-on monitoring operation for preferred application in the driver assistance system according to the invention is described below.

A capacitive sensor is used to identify when a driver does not have his hands on the steering wheel (hands-off identification=identification that the driver has let go when a hands-on check is made). However, a hands-on check is preferably performed only above a lower, comparatively very low, speed threshold (for example 10 km/h). Below this speed threshold, the driver assistance system according to the invention remains active, even if the driver has let go of the steering wheel. If, at a vehicle speed above said lower speed threshold, it is identified that the driver has let go of the steering wheel, a request to touch the steering wheel (again) and/or a request to take over control of the vehicle (solely by the driver) is output in principle at least at a vehicle speed-dependent time interval from the point at which the driver let go.

After the point at which the driver has let go, a request to touch the steering wheel (HOR) (again) is preferably output in a comparatively short fixedly predefined time interval (for example 2 s) from the point at which the driver had let go. As an alternative, this short time interval can also be predefined in a variable manner depending on the vehicle speed. If there is still no contact with the steering wheel after said time interval, a request to take over control of the vehicle (TOR) is output after a time interval (for example 10 s<t<30 s) which is relatively long in comparison to the short time interval.

In particular, this relatively long time interval is, in principle, predefined to be shorter (for example 30>t>20 s) at least in a defined lower or moderate speed range (10 hm/h<v<30 km/h) as the vehicle speed increases.

In one development, the speed-dependent predefined relatively long time interval is constant (for example 10 s) above a defined upper speed threshold (for example 30 km/h), but longer than the fixedly predefined relatively short time interval, and therefore, for safety reasons, does not decrease further as the speed continues to increase.

An exemplary embodiment in this respect is mentioned further below. This hands-on monitoring operation is an independent idea for other driver assistance systems too, but is particularly preferably applicable to the above-described driver assistance system which comprises at least the two said lateral guidance-related subfunctions.

Preferably used sensor system and actuator system:
Sensor system:
  Video camera with lane and object identification.
  Front radar with object identification and object merging (front area).
  Side radars with object identification for the side region.
  Hands-off detection sensor in the steering wheel (HOD) only for STA/ALC.
  Driving state variables (steering angle, speed, yaw rate, . . . ).
Actuator system:
  Corrective steering intervention via EPS.
  Display/operator control concept (ABK): visual and acoustic indications by means of the combination instrument and an optional head-up display (HUD).
Overview of Control Functions—STA/ALC—General Description of Functions The "STA/ALC" driver assistance system according to the invention is a lateral guidance system which assists the driver in his driving tasks by means of corrective steering interventions.

The operating states of the STA/ALC system are: [off], [standby] or [active].

Above a defined vehicle speed threshold (for example approximately 70 km/h), STA/ALC can change to the [active] state only when a suitable lane is identified in front of the vehicle being driven. Below the defined vehicle speed threshold (for example approximately 70 km/h), the function can also move to [active] when a vehicle traveling ahead is identified within the same traffic queue and the driver's intended course therefore matches the current course profile of the vehicle in front. In the event of the defined vehicle speed threshold being undershot or exceeded, an automatic change in the activation condition and the associated system state takes place (preferably taking into account a hysteresis).

The STA/ALC function is designed as an assistance system which does not absolve the driver of responsibility but is intended to proactively relieve him of having to apply forces on the steering wheel, in particular in monotonous and tedious traffic situations. When the system is active, it is sufficient to touch the steering wheel, with steering by means of steering force not being required.

In the process, the driver is requested to substantially permanently keep at least one hand on the steering wheel. This is checked by means of a capacitive hands-off detection sensor which is incorporated in the steering wheel. If the driver lets go of the steering wheel, the function requests after a short time period that he grasps the steering wheel again, initially directly. In the event of a long-lasting hands-off state, the function changes over to the [standby] system state with a clear visual and acoustic indication. The time period for the hands-off check is (as already mentioned above) dependent on the vehicle speed.

The system provides a simple correction target selection which is considered to be transparent to the driver.

In order to increase the safety of the function during automatic active correction operations, additional safety systems, such as "preventative pedestrian protection", lane departure warning or side collision protection for example, are also activated, preferably automatically, when STA/ALC is active. If one of these functions cannot be activated, deactivation of both subfunctions (STA and ALC) to the [standby] state may take place. Automatically turning on safety systems can be predefined, for example, by a preselection in a menu of a vehicle computer (for example iDrive by BMW) by the driver.

The main part of the function logic of the lateral guidance is preferably implemented in the vehicle's own electronic driver assistance special equipment controller (SE controller), wherein elements can also be integrated in other controllers.

The majority of the data for the function is provided by a video camera which is known per se and in which algorithms for lane and object identification are already running.

With the inclusion of, in particular, the following parameters, a setpoint trajectory for all lateral guidance control interventions is calculated in the SE controller—depending on the current availability of said parameters:

lateral distance between the vehicle (EGO) being driven and the left-hand or right-hand lane boundary (if it can be identified) or the center of the vehicle traveling ahead (if it can be identified) (lateral offset), and/or angle between the longitudinal axis of the EGO vehicle and an identified lane boundary (if it can be identified) (heading angle), and/or bend curvature of the identified lane (if it can be identified), and/or position and movement history of the vehicle (ZO) traveling ahead in relation to the EGO vehicle (if present).

Driving dynamics data, such as vehicle speed, wheel rotation speed, yaw rate, steering angle, lateral acceleration, longitudinal acceleration, etc. for example, are provided by the rest of the overall vehicle assembly by means of data bus systems, which are known per se, of other controllers.

All of the available parameters are evaluated, in particular, in respect of determining a good pilot control value for rapid control. The evaluation method for the parameters is preferably designed in such a way that, in particular as part of the traffic jam assistant subfunction (STA) in the case of laterally guided following travel, in which the EGO vehicle is aligned substantially with the center of the vehicle traveling ahead, a prediction, which is as accurate as possible, about the expected movement of the vehicle traveling ahead is made. As a result, control deviations are kept low and the frequency and also the extent of the control intervention are minimized.

General Operating Principle of STA/ALC:

If the instantaneous vehicle course deviates from the setpoint trajectory to an excessive extent, a steering correction is initiated.

Function Logic Depending on the Speed:

The setpoint trajectory and, respectively, the required steering corrections are calculated depending on the driving speed as follows:

Lower speed range, for example 0 to 70 km/h:
    Primary use of position of the vehicle in front or movement history of the vehicle in front for determining suitable steering corrections.
    Taking into account identified lane markings for avoiding undesired steering corrections in respect of lane departure.
    Corrective steering interventions in respect of the center of the lane, provided that no vehicle in front is identified.
Moderate speed range, for example 70 to 130 km/h:
    Steering corrections in respect of the center of the lane.
    Time-limited bridging of non-identified lane markings by estimating the lane profile on the basis of a vehicle traveling ahead.
Upper speed range, for example 130 to 210 km/h:
    Steering corrections in respect of the center of the lane.
    No estimation of the lane profile by means of a vehicle traveling ahead on account of an assumed increased operating risk above the recommended speed.

The primary use of the vehicle in front as a correction target in the first speed range is the result of the limited availability of current lane identifications in situations with limited range of vision in the front region.

Especially in traffic jam situations and situations with heavy traffic flow, very short following distances (<10 m) due to vehicles traveling close together and additionally frequent partial covering of lanes ahead owing to lane straddling often occur. The result is a frequent inability to identify lanes. In order to increase the robustness to frequent lane misidentifications, the position of the vehicle in front is selected as the primary correction target in these situations. The lanes serve, however,—if identified—as a lateral boundary of the driver's intended course which is anticipated by the STA. The border of the transition between traffic jam-like situations and flowing traffic with greater ranges ahead is adopted on the basis of empirical determinations. In order to achieve a robustness which is suitable from the driver's view in the event of changing lane identification, a functional tolerance of 10 km/h is selected in addition to this empirical speed. In addition to the more robust separation between heavy traffic and normal traffic flow, the number of correction target changes given a limited lane availability in inner-city areas is also considerably reduced in this way. The permitted driving speed in inner-city areas may also be 60 km/h instead of 50 km/h. A tolerance range is likewise necessary as a result.

In order to prevent excessively narrow vehicles—such as motorcycles and bicycles for example—from being selected as the correction target, object classification and minimum width of the object traveling ahead is evaluated.

Activation Conditions:

When the driver operates the on/off switch on the steering wheel, which on/off switch is used jointly for the two subfunctions (STA/ALC), the system changes over to the [standby] system state.

In order that the lateral guidance assistance can change over from the [standby] system state to the [active] operating mode, the following requirements can preferably be met on their own or in any desired combination with one another:

A lane boundary is identified by the camera and judged to be "valid" by the function.
Checking criteria include:
    road bend radius >minimum value;
    lane width within a plausible range
or
    a vehicle traveling ahead which matches the movement direction of the vehicle being driven is accepted only below the predefined vehicle speed threshold (of 70 km/h for example) for function activation.
At least one hand is on the steering wheel rim.
Defined additional safety systems (such as pFGS and LCA-SKW for example) are optionally [active] or can be successfully activated by the STA/ALC.
There are no identified faults in partner controllers or the environmental sensor system, setpoint value generation means or actuator system.

If the above conditions are met, the STA/ALC function changes over to the [active] state and executes the above-described steering corrections.

If one of the function requirements for lateral guidance assistance is temporarily not met, the function changes over to the [standby] state with or without driver indication (also see "silent deactivation" below). As soon as all of the conditions are met again, the steering corrections are automatically reactivated.

Switch-Off Conditions:

The lateral guidance assistance for the driver is deactivated when, for example, at least one of the following conditions is met:

The driver has switched off the function by means of the on/off switch.
Manual DSC deactivation (DSC off) or deactivation of an electronic controller in which functional modules of the ALC/STA are also integrated).
Automatic braking intervention and/or steering intervention of a safety system (for example iBrake initial braking, pFGS intervention or LCA intervention).

The lateral guidance assistance for the driver is switched to [standby] when one of the following conditions is met:

Lower speed range (for example 0 to 70 km/h): a vehicle in front is no longer identified and there is no lane marking.

Moderate speed range (for example 70 km/h<v<130 km/h): no lane marking is identified and there is no vehicle in front in order to temporarily bridge the absence of a lane.

Upper speed range (for example v>130 km/h): no lane marking is identified.

The minimum lane width is undershot.

Lateral guidance assistance is temporarily interrupted by lane change warning (LCA), DSC control interventions, over-/understeer identification, high driver steering torques or high longitudinal decelerations.

Driver exceeds the permissible hands-off period.

Driver operates the indicator.

When the driver takes his hands off the steering wheel, a hands-on request (HOR) is made by means of a visual indication in the combination instrument (for example steering wheel with hand symbol, also see the exemplary embodiment relating to the display operator control concept, below) after a predefined time period (for example approximately 2 seconds). If the driver does not return his hands to the steering wheel, a takeover request (TOR) is made by means of a visual indication (for example flashing red steering wheel with hand symbol in the combination instrument or in the HUD together with an acoustic warning) after a speed-dependent time period.

Displays

The primary feedback relating to the status of the STA/ALC function is made by means of the combination instrument and—if incorporated in the vehicle—additionally by means of a head-up display (HUD).

In all cases in which the lateral guidance has to be completely deactivated from the [active] or [standby] system states in a manner which is unexpected by the driver, a takeover request is always made to the driver (TOR or check control message (CCM)).

However, if the function is turned off by an active driver operation (for example manual deactivation of STA/ALC, manual DSC deactivation, heavy oversteering of the function), "silent" deactivation which can be sensed by the driver is performed.

The invention has, in particular, the following advantages over the prior art:

A higher and more anticipatory assistance level with virtually "steering force-free driving".

The lateral guidance can be perceptible independently of the longitudinal guidance; no turn-off when the brake is operated, no necessary coupling to the longitudinal guidance, such as for example to the active state of a driving speed control system with distance control (ACC).

Active feedback of the current control strategy (lane or vehicle in front); improved assistance in a traffic jam situation by orientation to the vehicle in front.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
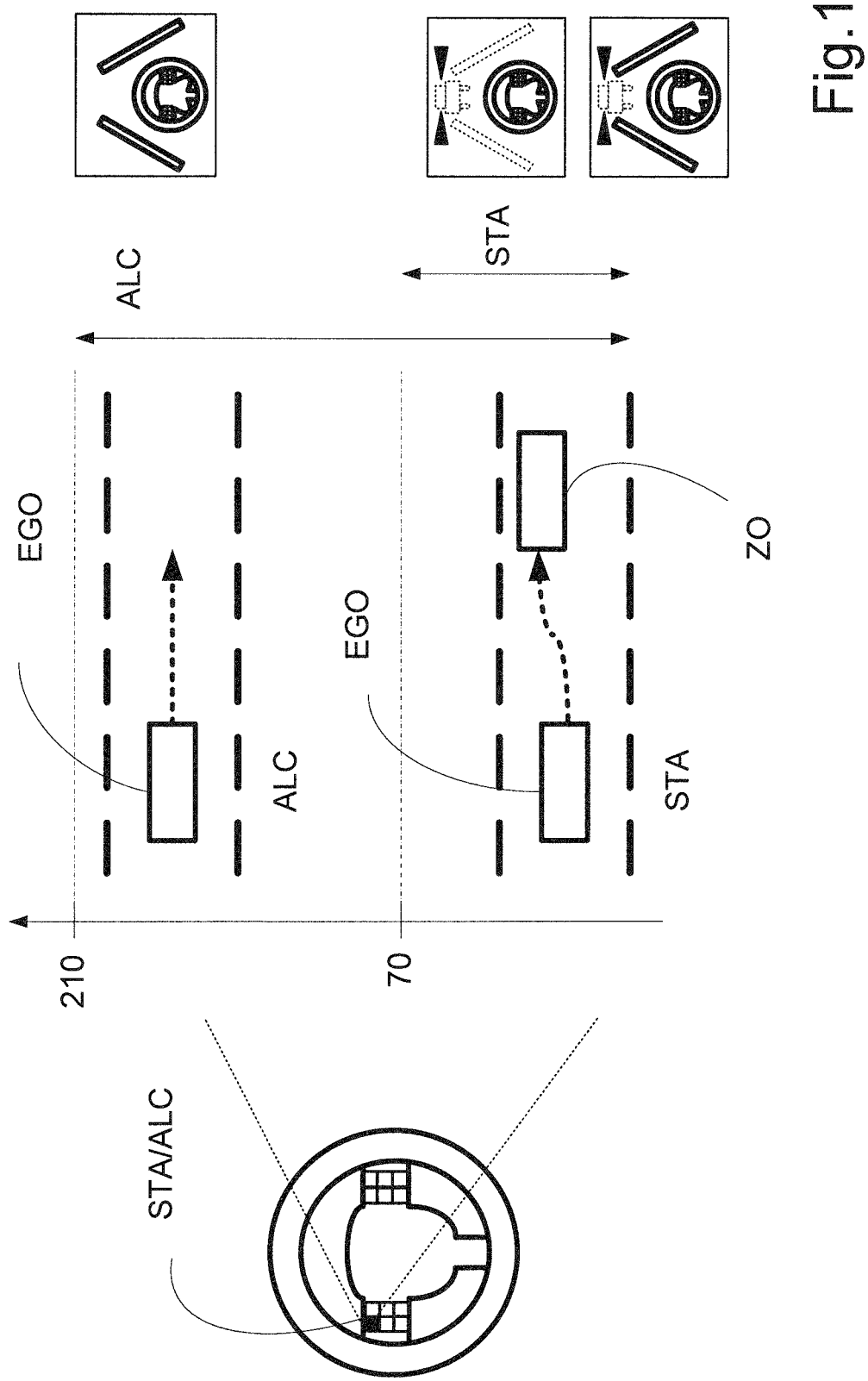
FIG. 1 shows an overview of the general manner of operation of the driver assistance system according to the invention comprising the combination of the two subfunctions STA and ALC.

FIG. 1 schematically shows a multifunctional steering wheel with buttons for different functions. One possible fitting point for the STA/ALC on/off button for activating the driver assistance system according to the invention is illustrated at the top left with respect to the center of the steering wheel. Further operator control elements for further driver assistance systems, such as a longitudinal guidance system for example, are also preferably located there.

The following components, which are known per se, are used without said components having to be described in any detail here: the vehicle has, in the front region, a stereo camera and a long-distance radar. The side and rear regions of the vehicle are covered by four side radars. Other vehicles, lane markings and pedestrians are identified by way of a stereo front camera. The detected objects are then merged using the long-distance radar and confirmed. Detection is extended to the side region owing to the four side radars, as a result of which a side collision warning can be output in critical situations. All of the driver assistance systems are monitored and controlled by a superordinate coordinator in order to ensure controlled running of all of the longitudinal and lateral guidance systems with one another. Furthermore, some safety functions (DSC, LCA) are automatically activated with the traffic jam assistant in order to further increase the driving safety when using the steering assistant. The central components of the system architecture form, for example, a driver assistance controller SE and a braking control DSC together with the controller EPS for the electrical steering.

FIG. 1 schematically illustrates the functionalities of the driver assistance system according to the invention:

ALC: above 70 km/h (predefined lower speed threshold), assistance of the driver to keep the vehicle EGO being driven in the identified lane.

STA: control below the predefined lower speed threshold (of 70 km/h here) preferably in relation to a vehicle ZO in front (preferably corresponding to the target object selection of a known ACC system for distance-related longitudinal guidance), if present; but the profile of identified lanes (no straddling) or boundary structures (necessary coupling, for example with side collision warning) is also taken into account.

ALC: control in relation to lane markings if the vehicle ZO in front moves away.

FIG. 1 also illustrates possible associated displays. Further display options are discussed in more detail in conjunction with FIGS. 3 and 4.

As already mentioned above, the driver is, in principle, requested to keep at least one hand on the steering wheel substantially permanently. This is checked by a capacitive hands-off detection sensor which is incorporated in the steering wheel. If the driver lets go of the steering wheel, the function requests after a short time period that he grasps the steering wheel again, initially directly. In the event of a long-lasting hands-off state, the function changes over to the [standby] system state with a clear visual and acoustic indication. The time period for the hands-off check is dependent on the vehicle speed.

Figure 2:
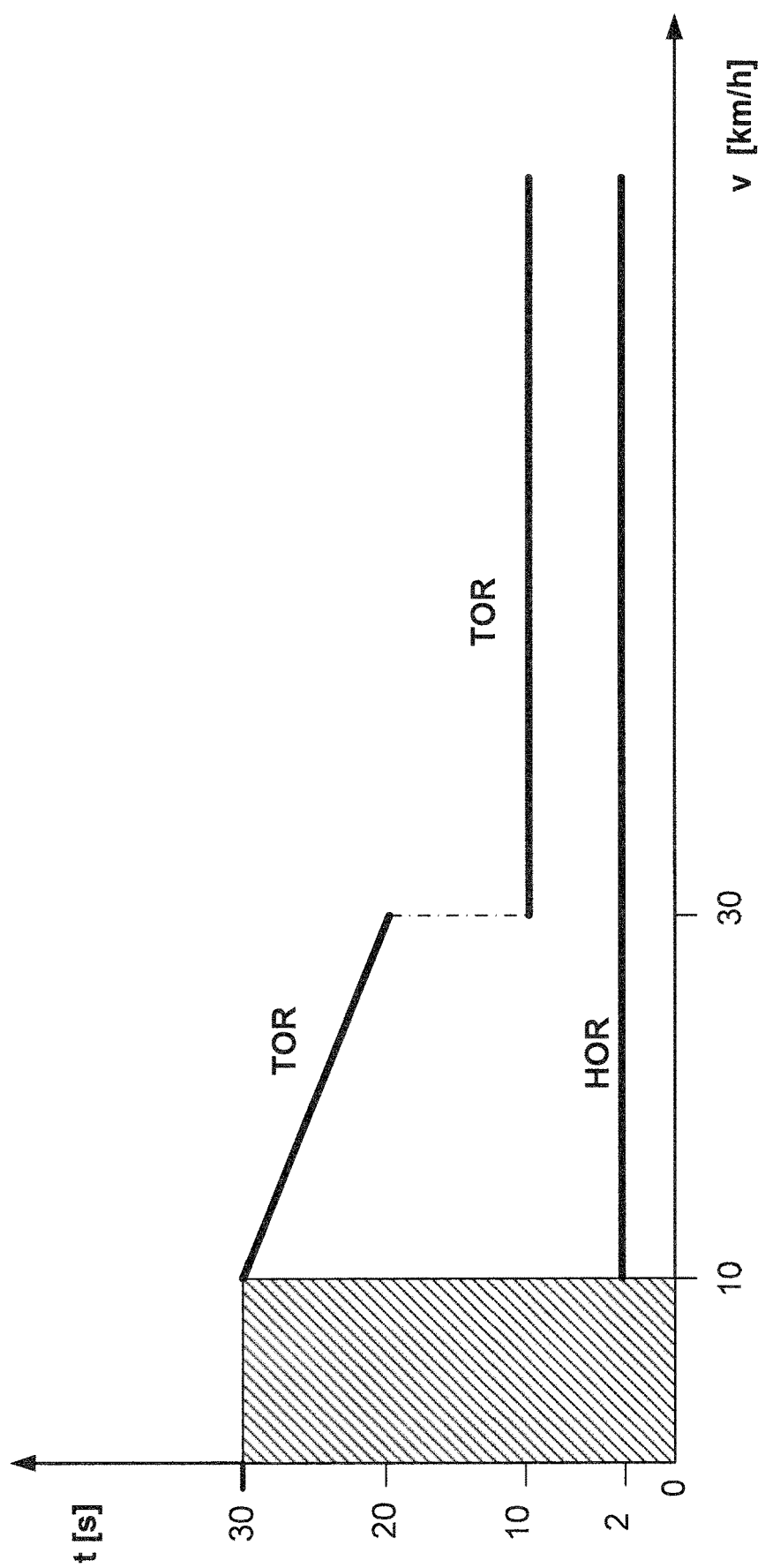
FIG. 2 is a graph of the permissible hands-off times depending on the driving speed for the hands-on monitoring according to the invention.

FIG. 2 illustrates particularly preferred permissible hands-off times depending on the driving speed v in conjunction with the hands-on monitoring already described in general above.

For a lower speed range (for example for 0<v<10 km/h): no hands-on monitoring, no HOR (=request to touch the steering wheel (again)), no TOR (=request for the driver to take over control of the vehicle or deactivation of the driver assistance system).

For a moderate speed range (for example for 10<v<30 km/h): HOR after a fixedly predefined relatively short time interval (for example 2 s) and additionally, as the speed v increases, reduction of the maximum permissible hands-off time t for TOR from an upper value (for example of 30 s) to a lower value (for example 20 s).

For an upper speed range (for example forv>30 km/h: HOR further after the fixedly predefined time interval (here 2 s) and additionally maximum permissible hands-off time t for TOR or speed-dependent relatively longer time interval until TOR to a fixedly predefined value (for example 10 s) which is longer than the relatively short time interval for HOR in any case.

HOR: hands-on request=request to touch the steering wheel

TOR: takeover request=request to take over control of the vehicle completely, for example including acoustic warning and simultaneous termination of the steering corrections (STA/ALC deactivation or [standby]).

The speed-dependent relatively long time interval t does not have to have a constant profile over the speed v, as is illustrated in the case of the sudden transition (from 20 s to 10 s) from the moderate speed range to the upper speed range, here at 30 km/h.

The speed-dependent hands-on monitoring can be used as an independent idea for driver assistance functions as desired or as a development to the SCA/ALC driver assistance function.

Figure 3:
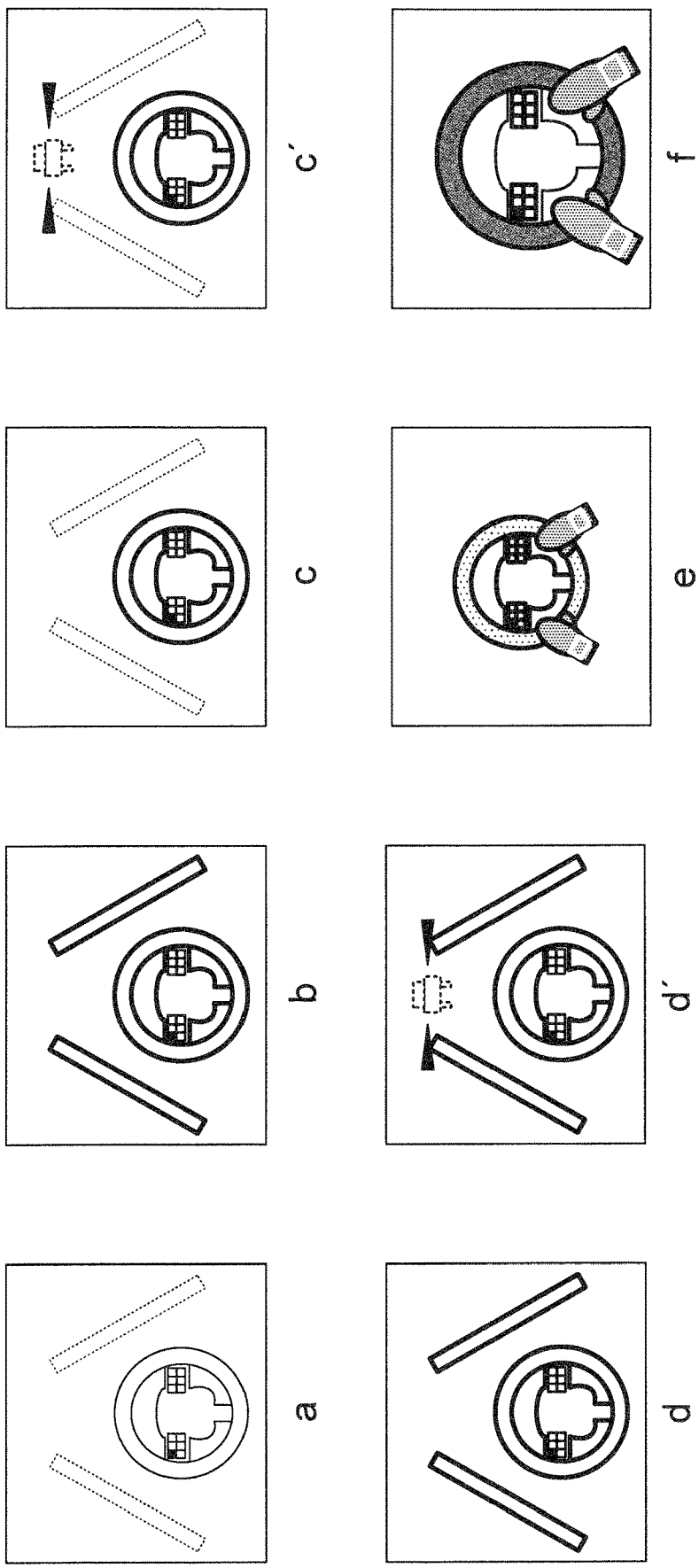
FIG. 3 shows an advantageous exemplary embodiment of the display concept of the STA/ALC driver assistance system according to the invention without coupling to a longitudinal guidance system.

FIG. 3 shows a display concept which matches the STA and ALC subfunctions. The display concept contains the following possible functional states:

a. first display for the standby mode [standby] when STA/ALC is switched on: a lightly indicated (for example gray) steering wheel symbol without or with only lightly indicated (for example gray) lanes and without a vehicle traveling ahead appears; and/or b. second display for corrective steering interventions in respect of the center of the lane (ALC intervention): a distinct (for example green) steering wheel symbol with distinct (for example green) lanes and without a vehicle traveling ahead appears; and/or c. third display for corrective steering interventions in respect of the vehicle traveling ahead without an identified lane: a distinct (for example green) steering wheel symbol without or with only lightly indicated (for example gray) lanes and possibly with a vehicle traveling ahead (c') appears, which vehicle traveling ahead preferably has a different appearance to the target object of a longitudinal control operation; and/or d. fourth display for corrective steering interventions in respect of the vehicle traveling ahead with an identified lane: a distinct (for example green) steering wheel symbol with distinct (for example green) lanes and possibly with a vehicle traveling ahead (d') appears, which vehicle traveling ahead preferably has a different appearance to the target object of a longitudinal control operation; and/or e. fifth display for a hands-on request (HOR): at least one very distinct steering wheel symbol with a hand symbol in a first optical warning stage, for example in an orange color, appears; and/or f. sixth display for a takeover request (TOR): at least one very distinct steering wheel symbol with a hand symbol in a second optical warning stage, for example in a red color and/or increased in size, appears, preferably accompanied by an acoustic or haptic warning.

Figure 4:
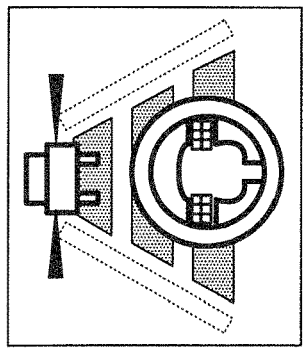
FIG. 4 shows an advantageous exemplary embodiment of the display concept of the STA/ALC driver assistance system according to the invention including coupling to a longitudinal guidance system.
Figure 4:
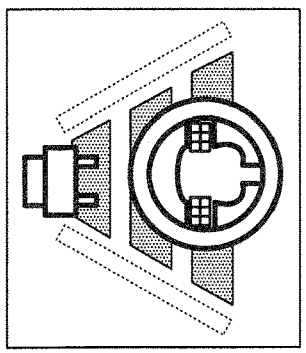
Figure 4:
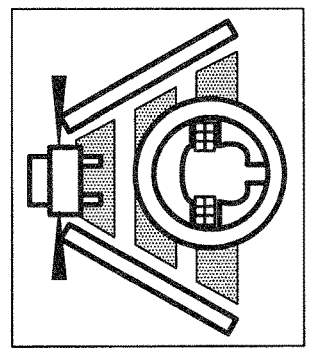
Figure 4:
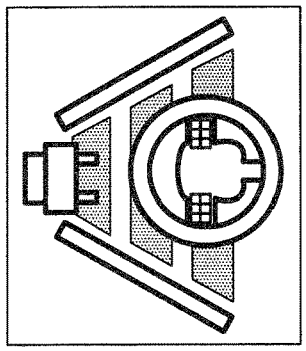
Figure 4:
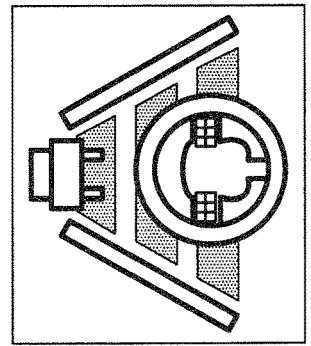
Figure 4:
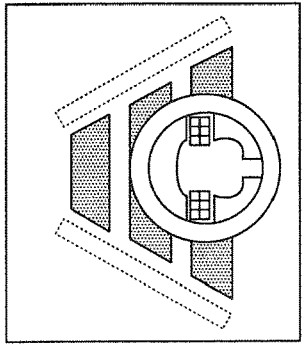

FIG. 4 shows the displays from FIG. 3 with superimposed longitudinal guidance-related following travel by an activated additional longitudinal control system, as are known per se by the distance-related longitudinal control system (ACC) in vehicles manufactured by the Applicant. The symbol of a vehicle traveling ahead according to c' and d' of FIG. 3 has a different appearance in this case according to FIG. 4 (for example change from gray to colored, from small to large, etc.).

a. first display for the standby mode [standby] of both systems when STA/ALC is switched on: a lightly indicated (for example gray) steering wheel symbol without or with only lightly indicated (for example gray) lanes appears and is superimposed on the standby symbol of the longitudinal control system; and/or b. second display for corrective steering interventions in respect of the center of the lane (ALC intervention): a distinct (for example green) steering wheel symbol with distinct (for example green) lanes appears and is superimposed on the following travel symbol of the longitudinal control system; and/or c. third display for corrective steering interventions in respect of the vehicle traveling ahead (STA) without an identified lane: a distinct (for example green) steering wheel symbol without or with only lightly indicated (for example gray) lanes appears and is superimposed on the following travel symbol of the longitudinal control system. In case c', the symbol for a vehicle traveling ahead in the case of additional longitudinally guided following travel differs from the symbol in the case of solely laterally guided following travel (see c' in FIG. 3); in FIG. 4, the symbol of the longitudinally guided following travel appears with the arrow symbol portion of the symbol of the solely laterally guided following travel according to FIG. 3 and/or d. fourth display for corrective steering interventions in respect of the vehicle traveling ahead (STA) with an identified lane: a distinct (for example green) steering wheel symbol with distinct (for example green) lanes appears and is superimposed on the following travel symbol of the longitudinal control system. In case d', the symbol for a vehicle traveling ahead in the case of additional longitudinally guided following travel differs from the symbol in the case of solely laterally guided following travel (see d' in FIG. 3); in FIG. 4, the symbol of the longitudinally guided following travel appears together with the arrow symbol portion of the symbol of the solely laterally guided following travel according to FIG. 3 and/or e. fifth display, (not shown, cf. FIG. 3 (e)) for a hands-on request (HOR): at least one very distinct steering wheel symbol with a hand symbol in a first optical warning stage, for example in an orange color, appears and/or f. sixth display, (not shown, cf. FIG. 3 (f)) for a takeover request (TOR): at least one very distinct steering wheel symbol with a hand symbol in a second optical warning stage, for example in a red color and/or increased in size, appears, preferably accompanied by an acoustic or haptic warning.

The different appearances of the vehicle traveling ahead in cases c' and d' of FIG. 3 and FIG. 4 can relate to, for example, the size, the color, the brightness and/or an additional symbol (such as the double-headed arrow shown).

The longitudinal control system can also be automatically turned on by a preselection predefined on the driver side, for example by use of an operator control menu, using the STA/ALC button, so that no additional button has to be operated when longitudinal guidance-related following travel is desired in addition to the two other lateral guidance-related subfunctions STA and ALC.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system in a motor vehicle that carries out at least active lateral guidance interventions and is activatable in a manner decoupled from activation of a longitudinal control system but is activatable both with and without longitudinal control, the driver assistance system comprising:
    a traffic jam assistant subfunction of the driver assistance system;
    a lane guidance assistant subfunction of the driver assistance system;
    a single on/off button by which the traffic jam assistant subfunction and the lane guidance assistant subfunction are configured to be jointly enabled and disabled, wherein
        the two subfunctions move from a standby mode to an active mode in response to identified lane markings while the motor vehicle speed exceeds a predefined upper speed threshold and while a vehicle traveling ahead is not identified.

2. The driver assistance system as claimed in claim 1, wherein
    the traffic jam assistant subfunction is activatable when the motor vehicle speed lies below a predefined lower speed threshold, which is below the predefined upper speed threshold, and the vehicle traveling ahead is identified at the same time, and
    the traffic jam assistant subfunction performs corrective steering interventions in respect of the vehicle traveling ahead in the form of laterally guided following travel.

3. The driver assistance system as claimed in claim 2, further comprising:
    a safety system for haptic side collision prevention necessarily coupled to the traffic jam assistant subfunction.

4. The driver assistance system as claimed in claim 2, wherein
    the lane guidance assistant subfunction is activatable:
        when the motor vehicle speed lies below the predefined lower speed threshold and no vehicle traveling ahead is identified at the same time, and
        when the motor vehicle speed lies above the predefined lower speed threshold, and
    the lane guidance assistant subfunction carries out corrective steering interventions in respect of a center of the lane.

5. The driver assistance system as claimed in claim 4, wherein
    when the motor vehicle speed lies in a moderate speed range above the predefined lower speed threshold and below the predefined upper speed threshold, the lane guidance assistant subfunction is oriented to the vehicle traveling ahead for a predefined limited period of time when identification of the lane markings is not possible, the vehicle traveling ahead is identified, and only when the lane guidance assistant subfunction is providing active lateral guidance.

6. The driver assistance system as claimed in claim 5, wherein
    the orienting of the lane guidance assistant subfunction to the vehicle traveling ahead for the predefined limited period of time is in a form of a time-limited lane identification bridging operation.

7. The driver assistance system as claimed in claim 4, wherein
    a setpoint trajectory is calculated for the steering interventions from the following parameters, depending on current availability:
        lateral distance between the motor vehicle being driven and a left-hand or right-hand lane boundary and/or a center of the vehicle traveling ahead,
        angle between the longitudinal axis of the motor vehicle and an identified lane boundary,
        bend curvature of the identified lane, and/or
        position and movement history of the vehicle traveling ahead in relation to the motor vehicle.

8. The driver assistance system as claimed in claim 1, wherein
    when the driver assistance system is activated, further safety systems are automatically switched on, and
    the further safety systems either being fixedly predefinable on a system side or being preselectable by a setup operator control menu on a driver side.

9. The driver assistance system as claimed in claim 4, wherein
    when the driver assistance system is activated, but only when the motor vehicle speed lies above a lower threshold, a check is made by way of a capacitive sensor which is incorporated in a steering wheel to determine whether a driver is touching the steering wheel by way of at least one hand.

10. The driver assistance system as claimed in claim 9, wherein
    in response to the driver letting go of the steering wheel, a request is output to the driver to touch the steering wheel after a relatively short time interval and
    a request to take over control of the motor vehicle is output to the driver after a relatively long time interval, wherein
        at least the relatively long time interval is predefined depending on the motor vehicle speed.

11. The driver assistance system as claimed in claim 10, wherein
    the relatively long time intervals for the takeover request are predefined to be shorter with increasing speed of the motor vehicle in a moderate speed range, which is below the predefined upper speed threshold and above the predefined lower speed threshold.

12. A driver assistance system in a motor vehicle that carries out at least active lateral guidance interventions and is activatable in a manner decoupled from activation of a longitudinal control system but is activatable both with and without longitudinal control, the driver assistance system comprising:
- a traffic jam assistant subfunction of the driver assistance system;
- a lane guidance assistant subfunction of the driver assistance system;
- a single on/off button by which the traffic jam assistant subfunction and the lane guidance assistant subfunction are configured to be jointly enabled and disabled, wherein
  - in response to the driver letting go of the steering wheel, a request is output to the driver to touch the steering wheel after a relatively short time interval and a request is output to the driver to take over control of the motor vehicle after a relatively long time interval, which is longer than the relatively short time interval, wherein
    the relatively long time interval:
    - becomes correspondingly shorter as the motor vehicle speed increases over a moderate speed range; and
    - becomes constant once the motor vehicle speed exceeds a predefined upper speed threshold defined by an upper limit of the moderate speed range and remains constant even as the motor vehicle speed continues to increase beyond the predefined upper speed threshold, and
    - remains greater than the relatively short time interval for the request to touch the steering wheel.

13. The driver assistance system as claimed in claim 10, wherein
the two subfunctions move to the standby mode when one of the following conditions is met:
(1) the motor vehicle speed is below the predefined lower speed threshold, the vehicle traveling ahead is no longer identified, and the lane markings are not identified,
(2) the motor vehicle speed is above the predefined lower speed threshold, lane markings are not identified, and the vehicle traveling ahead is not identified to temporarily bridge the lateral guidance interventions,
(3) the motor vehicle speed exceeds the predefined upper speed threshold and no lane marking for lane identification is identified,
(4) a minimum lane width is undershot,
(5) other vehicle systems cause an interruption,
(6) a driver exceeds the permissible hands-of duration (TOR), and
(7) the driver operates an indicator.

14. The driver assistance system as claimed in claim 1, wherein
in order to indicate the different states of the two subfunctions, the following display concept with different displays, which are usable individually or with one another in any desired combination, is provided:
a. a first display for the standby mode,
b. a second display for corrective steering interventions in respect of the center of a lane,
c. a third display for corrective steering interventions in respect of the vehicle traveling ahead without an identified lane,
d. a fourth display for corrective steering interventions in respect of the vehicle traveling ahead with an identified lane,
e. a fifth display for a hands-on request, and/or
f. a sixth display for a takeover request.

15. The driver assistance system as claimed in claim 14, wherein
in an event of following travel with additional longitudinal control of the vehicle traveling ahead, a symbol of a vehicle traveling ahead is additionally included in the different displays or the symbol of a vehicle traveling ahead is provided with a different appearance.

16. The driver assistance system as claimed in claim 1, wherein
the two subfunctions move to a standby mode when the motor vehicle is in a moderate speed range above a non-zero predefined lower speed threshold and below the predefined upper speed threshold, lane markings are not identified, and the vehicle traveling ahead is not identified to temporarily bridge the lateral guidance interventions.

17. The driver assistance system as claimed in claim 1, wherein
a setpoint trajectory is calculated for corrective steering interventions from a lateral distance between the motor vehicle being driven and a left-hand or right-hand lane boundary or center of the identified vehicle traveling ahead.

18. The driver assistance system as claimed in claim 1, wherein
a setpoint trajectory is calculated for corrective steering interventions from an angle between the longitudinal axis of the motor vehicle and an identified lane boundary.

19. The driver assistance system as claimed in claim 12, wherein
the relatively short time interval and the relatively time term interval are disabled when the motor vehicle speed is below a predefined lower speed threshold defined by a lower limit of the moderate speed range while the two subfunctions remain active.

20. The driver assistance system as claimed in claim 1, wherein
the two subfunctions move from the standby mode to the active mode for a predefined limited period of time in response to the identified vehicle traveling ahead while the motor vehicle is traveling in a moderate speed range below the predefined upper speed threshold and while the lane markings are not identified.

21. The driver assistance system as claimed in claim 20, wherein
the two subfunctions move from the standby mode to the active mode for a predefined limited period of time in response to the identified vehicle traveling ahead while the motor vehicle is traveling in a low speed range, which is below the moderate speed range and below the predefined upper speed threshold, and while the lane markings are not identified.

* * * * *